SUBSCRIPTION TELEVISION SYSTEM

Filed Nov. 15, 1963 Sheet 1 of 5

INVENTOR.
Harold R. Walker
BY
Michael J. Striker
Atty

INVENTOR.
Harold R. Walker

BY

Michael S. Striker
Atty

INVENTOR.
Harold R. Walker
BY
Michael S. Striker
Atty

INVENTOR.
Harold R. Walker

BY

Michael J. Striker
Atty

SUBSCRIPTION TELEVISION SYSTEM

Filed Nov. 15, 1963 Sheet 5 of 5

INVENTOR
Harold R. Walker

BY
Michael J. Striker
Atty

United States Patent Office 3,440,338
Patented Apr. 22, 1969

3,440,338

SUBSCRIPTION TELEVISION SYSTEM

Harold R. Walker, Metuchen, N.J., assignor to Teleglobe Pay-TV System, Inc., New York, N.Y.

Filed Nov. 15, 1963, Ser. No. 324,010
Int. Cl. H04n *1/44*
U.S. Cl. 178—5.1 10 Claims

ABSTRACT OF THE DISCLOSURE

The transmitted signals are coded by setting some selected front porch portions to white level, and polarity inverting the video signal. The back porch is undisturbed for color signals, but may be removed for black and white. Audio may be multiplexed on a key subcarrier. The receiver reinverts the video signal and restores proper synch signals.

The present invention relates to a subscription television system. More particularly, the invention relates to a television system which provides for secret transmission of video and audio signals.

The principal object of the present invention is to provide a new and improved subscription television system.

An object of the present invention is to provide a subscription television system which may be utilized for normal transmission or secret transmission.

An object of the present invention is to provide a subscription television system in which the audio signal may be transmitted by telephone line.

An object of the present invention is to provide a subscription television system of simplicity of structure and components.

An object of the present invention is to provide a subscription television system without disruption of normal transmitter and receiver operation.

An object of the present invention is to provide a subscription television system which is inexpensive and readily and facilely repaired.

Another object of the present invention is to provide a subscription television system which is reliable, effective and efficient in operation.

Still another object of the present invention is to provide a subscription television system which involves simple connection of the encoding and decoding components to existing equipment with a minimum of inconvenience to the user or subscribed and to the transmitting station.

In accordance with the present invention, the subscription television system comprises a transmitter for transmitting a video signal. The video signal has a plurality of pedestals each having a leading edge, a trailing edge and a blanking voltage level at a first predetermined distance from a reference level and a horizontal synch pulse extending from each of the pedestals to a second predetermined distance from the reference level greater than the first predetermined distance, each of the horizontal synch pulses having a leading edge, a trailing edge and a time duration smaller than the blanking voltage duration of the corresponding pedestal so that each of the blanking voltage levels extends a determined front porch distance from the leading edge of the pedestal to the leading edge of the corresponding horizontal synch pulse. The transmitter includes transmitter audio components for simultaneously transmitting an audio signal of a frequency within the audible frequency range synchronized with the video signal. A transmitter encoder provides noise signals in selected front porch durations of the video signal and inverts the polarity of the video signal so as to induce distortion of the picture. The transmitter encoder includes a pulse source for providing pulses of a predetermined duration at a predetermined repetition rate, a mixer for superimposing the pulses provided by the pulse source on the video signal, and an inverter for inverting the polarity of the video signal provided by the mixer. The superimposed pulses extend toward the reference level, 100% modulation, of the video signal after inversion. A receiver decoder receives the video signal and reinverts the polarity of the video signal so as to nullify the effect of the encoder and provide an undistorted picture. A receiver receives and reproduces the video signal from the receiver decoder and receives and reproduces the audio signal in synchronism with the video signal In order that the present invention may be readily carried into effect, it will now be described with reference to the accompanying drawings, wherein:

In the figures the same components are indicated by the same reference numerals.

Figure 3:
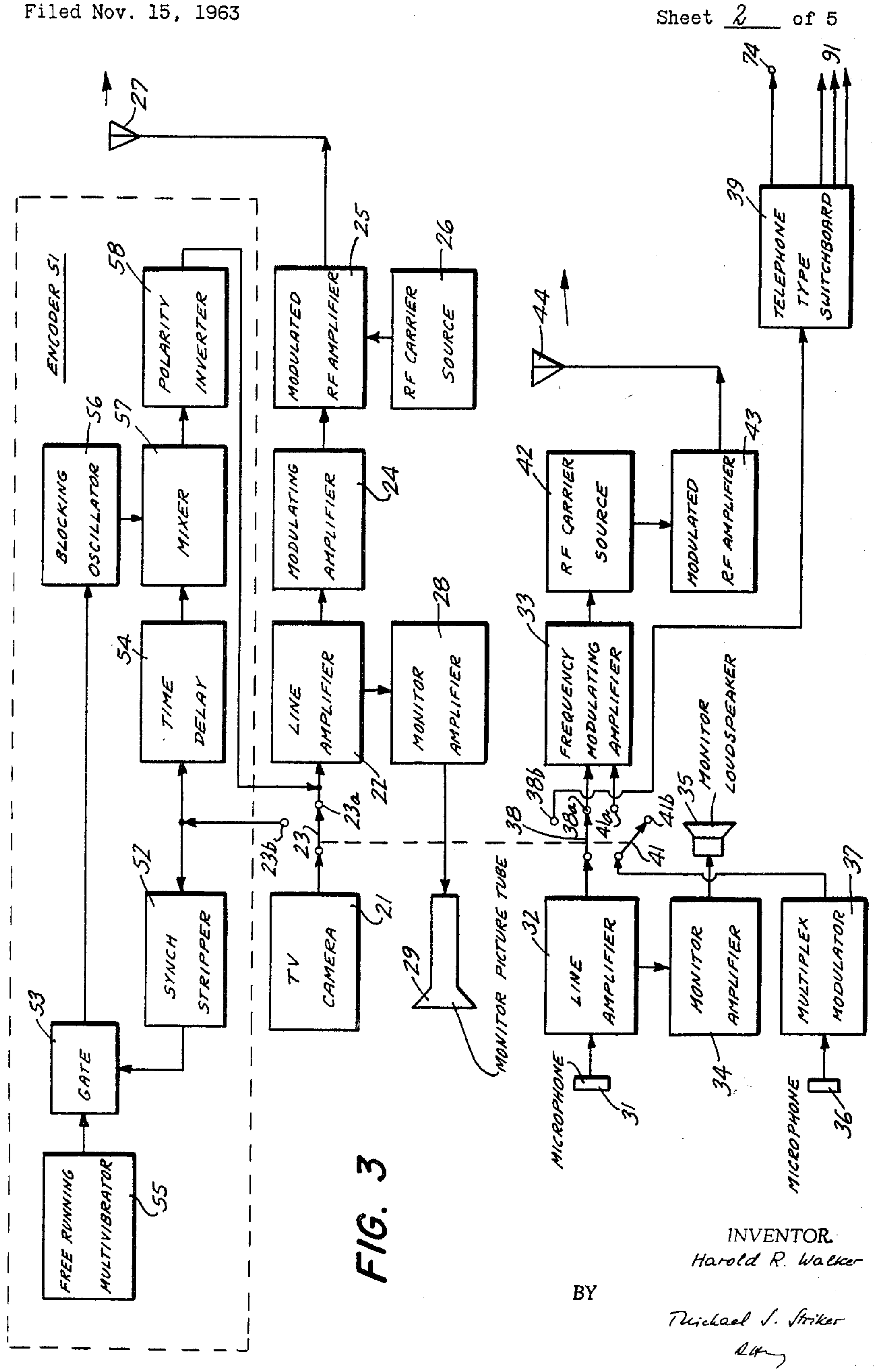
FIG. 3 is a schematic block diagram of an embodiment of a transmitting station of the subscription television system of the present invention.
Figure 4:
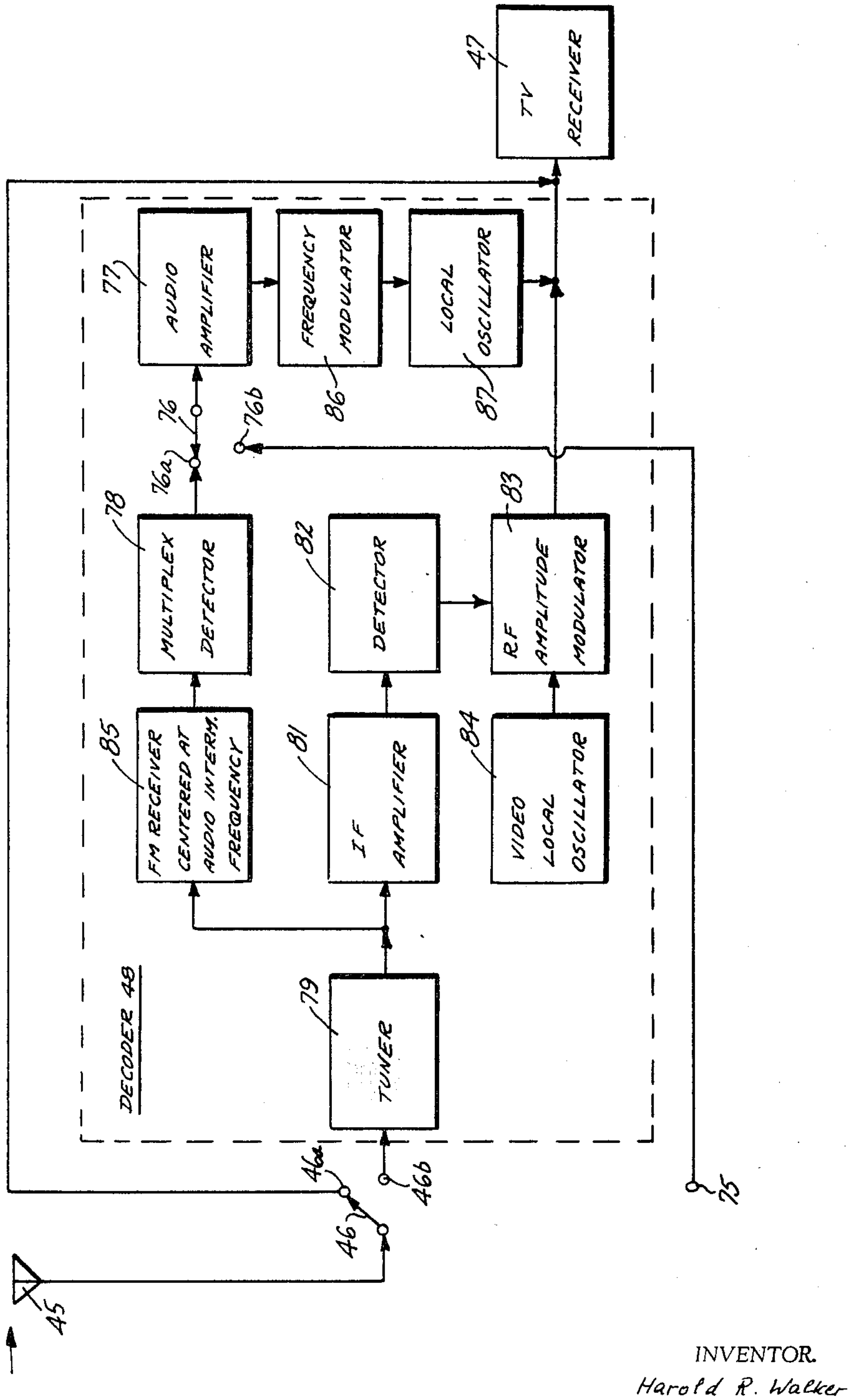
FIG. 4 is a schematic block diagram of an embodiment of a receiving station of the subscription television system of the present invention.

The circuitry and/or components of any of the blocks shown in FIGS. 3 and 4 is well known in the art and is fully shown and described in any suitable textbook on television or communication engineering such as, for example. "Principles of Television Engineering," by Donald G. Kink, McGraw-Hill Book Company, Inc., 1940, or "Radio Engineering Handbook," Keith Henney, Editor-in-Chief, 4th edition, McGraw-Hill Book Company, Inc., 1950, chapter 19 on Television by Donald G. Fink, pages 995–1050.

The geometric fidelity of the reproduction of a picture in a TV system depends upon the exact correspondence and position of the scanning spot at the transmitter and receiver. This correspondence requires that the periodicity and phasing of the horizontal and vertical scanning motions at the two terminii, i.e. at the transmitter and at the receiver of the television communication system, be alike. Suitable signals are transmitted which indicate the beginning of each frame, or field repetition in the case of interlaced scanning, and the beginning of each line. These synchronizing signals are part of the complete video signal, and occur during time not utilized by the picture signal itself, i.e., during the interval in which the scanning spot is returned to its original position after completing a line or field traversal. In terms of the frequency spectrum of the picture signal, the frequency components are multiples of line and frame frequency, their phase and amplitude being such that they have no effect on the picture except around the edges where they form a narrow border which cannot be used for the image and which, in cathode ray terminal tubes, has no real existence.

Scanning in the case of electronic terminal tubes is produced by deflecting an electron stream periodically in two mutually perpendicular directions by means of suitably varying magnetic or electrostatic fields. The current or voltage producing these fields is supplied from two deflection generators, one operating at line frequency and the other operating at frame or field frequency. Each generator is controlled by its own synchronizing impulse; therefore, the complete signal must include two types which can be distinguished from one another by some form of selector circuit. It is usual to make the generator producing the synchronizing impulses at the transmitter the fundamental timing unit of the entire system. Thus, the synchronizing signal covers not only the scanning pattern at the reproducer, but also that at the pickup as well. The exact shape of the impulses for horizontal and vertical synchronzing depends upon how the signal is applied at the deflection generator and upon the circuits which separate the two components. Experience has prompted the almost universal adoption of synchronizing impulses which are "blacker than black," i.e. the blanking level corresponds to black in the video signal and the impulses extend below this level in the direction of black.

Figure 1:
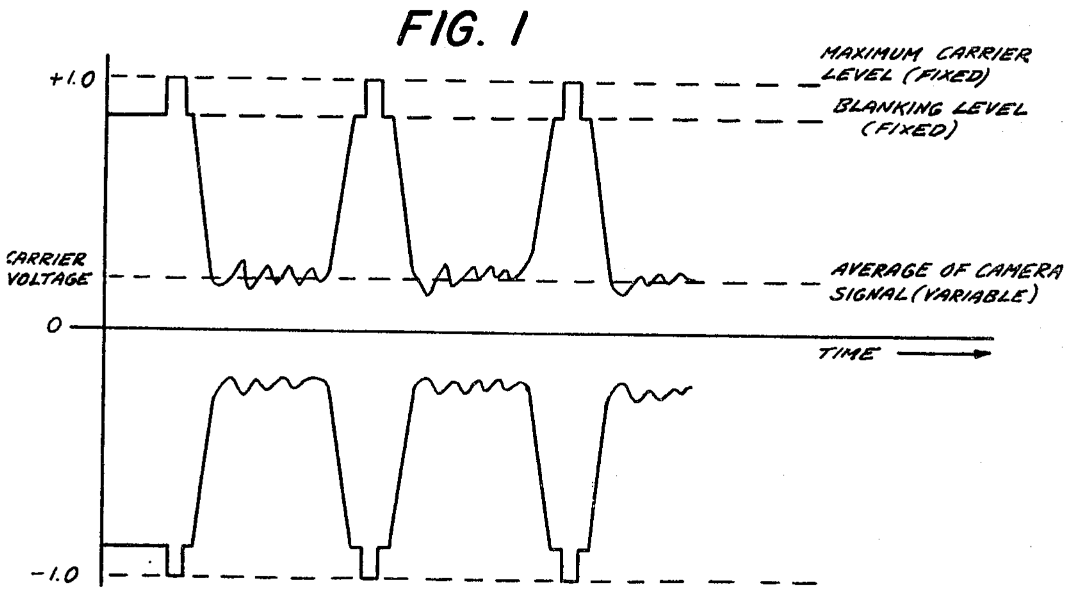
FIG. 1 is a graphical presentation of a modulated TV carrier signal clearly indicating the pedestals and horizontal synch pulses.
Figure 2:
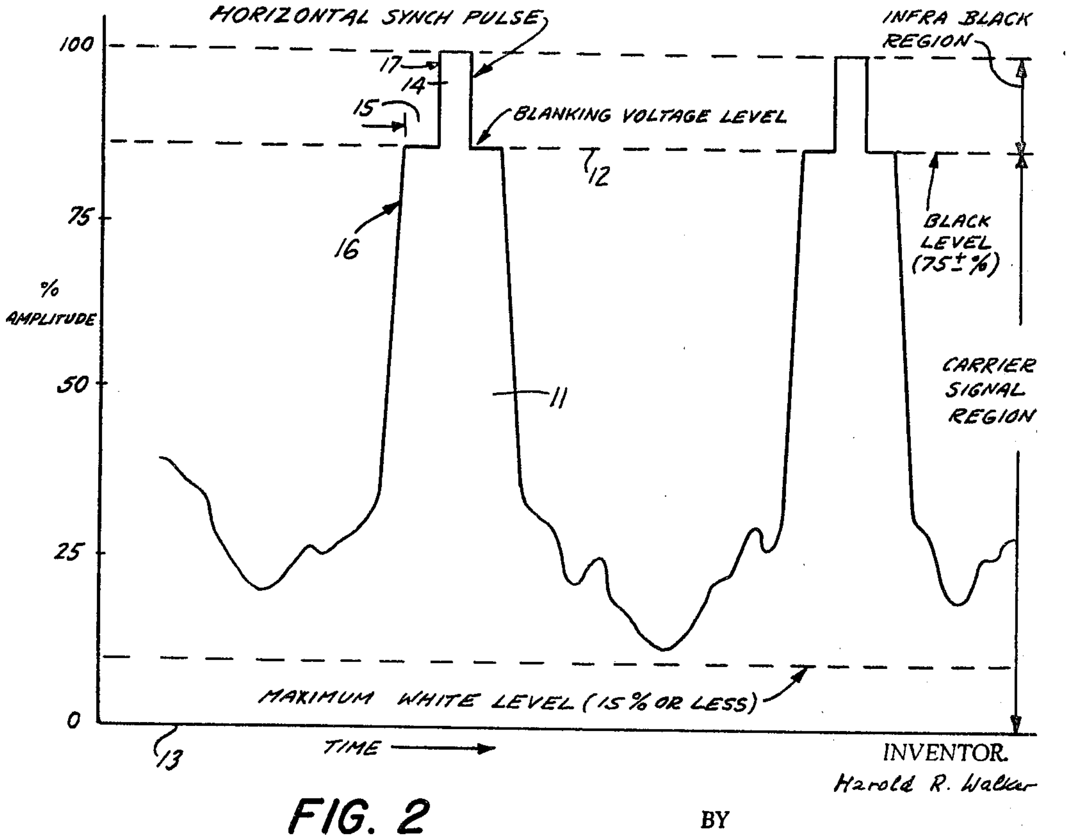
FIG. 2 is a graphical presentation of the details of the modulation envelope of a TV carrier signal clearly indicating the pedestals, the blanking voltage level, the horizontal synch pulses and the front and back porches.

The standard form of horizontal synchronizing pulse, blanking voltage level and pedestal is shown in FIGS. 1 and 2. The function of the pedestal is to support the horizontal synch pulse and to provide a black level and blanking voltage level. The black level serves as a reference guide for the picture in a normal transmission system and ensures that the black portions of the picture are black when the picture is reproduced. The function of the horizontal synch pulses is to trigger an oscillator in order to bring the electron beam from the right hand side of the screen to the left hand side. Once the beam is on the left hand side, the oscillator is no longer directly under the control of a pulse and goes about its usual function of sweeping the beam across the screen. Thus, each horizontal synch pulse that precedes the line detail sets up the beam in readiness for the scanning out of this information. The next pulse arrives when the beam is at the far right hand side of the screen, at the very end of the line.

Following the synchronizing signal of each pedestal is a short burst of a sine wave used for color synchronization in color receivers. Although this is not shown in the figures, it may be readily included in color systems; the system of the present invention being readily adaptable to either black and white or color TV systems. The color burst superimposed on the back porch of the pedestal consists of 8 to 11 cycles of a color synchronizing signal.

In similar manner, the vertical pulses serve the purpose of bringing the electron beam back to the top of the screen for the beginning of each field. The construction of the video signal is clearly shown with its synch pulses in FIGS. 1 and 2.

In FIGS. 1 and 2, several lines of an image are shown complete with the detailed information, blanking voltages and horizontal synch pulses. The blanking and synchronizing voltages occupy approximately 20% to 25% of the total signal amplitude. The blanking voltage retains its control of the cathode tube grid for some time before and after each horizontal synchronizing pulse. This is done to make certain that no beam retrace is visible at all on the screen. As soon as the blanking voltage releases control of the grid, the line detail becomes active once more. All the lines of one field follow this form, the only difference occurring in the camera detail of the various sections of the image. At the end of the last horizontal line it is necessary to insert a vertical impulse that will bring the beam back to the top of the screen again. During the period that the vertical pulse is active, it is imperative that the horizontal oscillator should not be neglected, because if it is, the horizontal generator would probably slip out of synchronization. To avoid this, the horizontal synchronizing pulses are sent with the vertical pulse.

When the video signal is imposed on a carrier wave, the envelope of the modulated carrier wave constitutes the video signal wave form. A modulated picture carrier and the details of the envelope are shown in FIG. 1. In the FCC standard video signal, as shown in FIGS. 1 and 2, the carrier amplitude is divided by the black level, which is also known as the blanking level or pedestal, at 75 plus or minus 2.5% of the maximum amplitude. The amplitude region above the black level is called the infrablack region and is occupied by the synchronizing signals. Signal levels in this region do not produce light in the receiver image.

The synch signals are of three types. These are horizontal signals for insuring the motion of the scanning agent along each horizontal line, vertical signals (not shown in the figures) for insuring the motion of the scanning agent vertically at the beginning of each field and a color burst to give color pictures the proper chromatic hue or tone. The peak amplitude of the waves, the height of the synchronizing pulses, and the black level amplitude are maintained constant throughout each broadcast. The portion of the carrier envelope extending below the black level is called the camera signal. The polarity of transmission in the FCC standard is negative; i.e. an increase in the light on the camera plate results, for example, in a decrease in the carrier amplitude as shown in FIGS. 1 and 2. The maximum white level is 15% or less of the maximum carrier amplitude. Intermediate grey tones exist between the maximum white level and the black level.

FIG. 2 illustrates the video signal before it is coded by the transmitting station encoder of the present invention. A pedestal 11 extends to the blanking voltage 12 at a first predetermined distance, which is the carrier signal region, from a reference level 13. The blanking voltage level 12 is also the black level. A horizontal synch pulse 14 extends from the pedestal 11 to a second predetermined distance from the reference level 13 which is the sum of the carrier signal region and the infrablack region. The horizontal synch pulse 14 has a time duration smaller than the blanking voltage duration of the pedestal so that the blanking voltage level extends a determined front porch distance 15 from the leading edge 16 of the pedestal to the leading edge 17 of the horizontal synch pulse. The duration of the blanking voltage between the trailing edge of the horizontal synch pulse and the trailing edge of the pedestal is the "back porch" distance.

In normal transmission and reception, the picture at the receiver seeks its proper tones or hues of black and white and grey, or the full spectrum of shades, by referring itself to, or hunting with reference to, the black level. The black level reference line usually appears as a vertical black and band on the screen of the receiver along one of the vertical boundaries of the picture frame. This black level reference band is normally beyond the view of the viewer since it is covered by the coverpiece which fits around the outside of the viewing screen of the receiver tube and acts to bound the actual viewing picture area.

Figure 5:
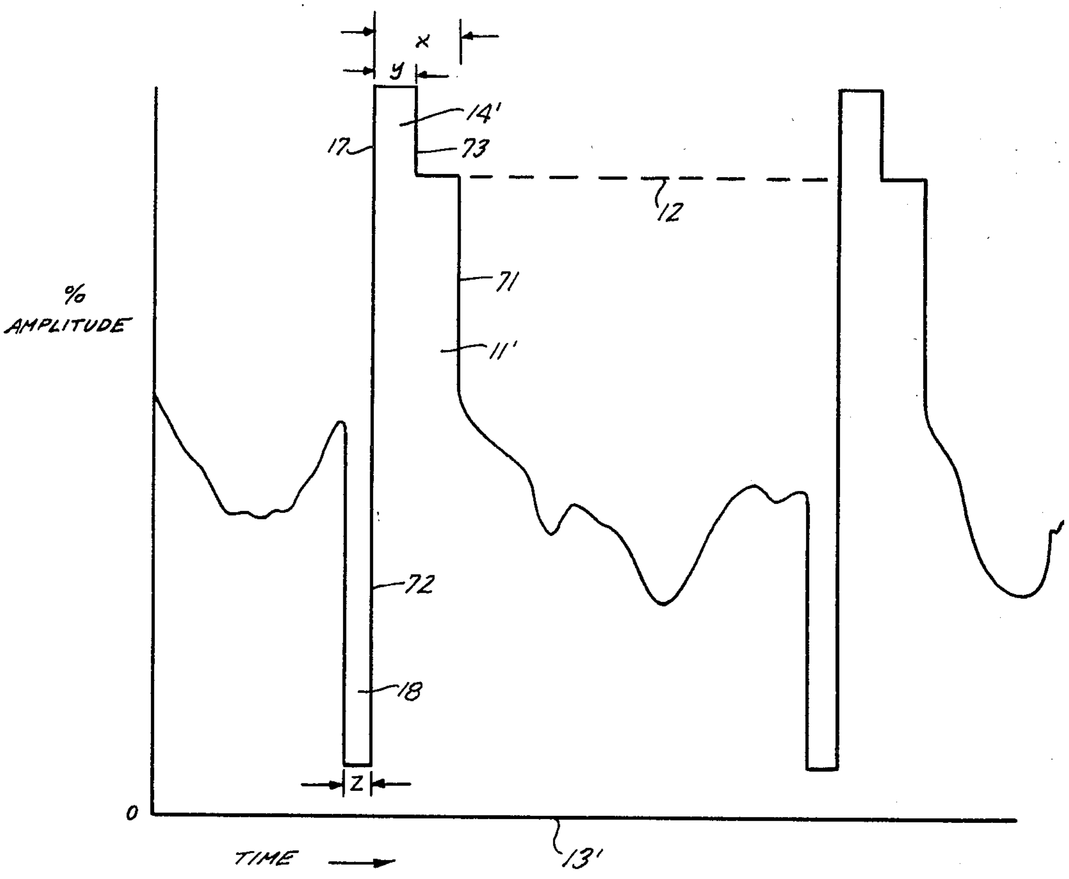
FIG. 5 is a graphical presentation of the details of the modulation envelope of FIG. 2 after the insertion of the noise pulses and before polarity inversion; and FIGS. *6a*, *6b*, *6c*, *6d* and *6e* are graphical presentations of the signals evident at indicated parts of the transmitting and receiving stations of FIGS. 3 and 4, respectively.
Figure 6A:
Figure 6B:

In accordance with the present invention, as illustrated in FIG. 5, white reference signals are provided in the front porch of each of the pedestals. The white reference signals 18 are then inverted in polarity, along with the video signal, as shown in FIG. 6*d*, so that they, in effect, serve as black reference signals. The insertion of the plurality of black reference signals 19 of FIG. 6*d* serves to induce distortion of the picture reproduced at the receiver. This is due to the fact that the black reference signals are produced only sporadically, so that the picture in hunting for its black reference level, attempts to follow any black level in the picture reproduced at the times that the inserted black reference signals or noise signals are not present in the video signal.

In other words, if a continuously inserted black reference level were available, the picture reproduced at the receiver would be a normal picture except for the fact that the white and black would be interchanged; i.e., a negative picture would be presented. When a black reference signal is provided only sporadically or periodically, the picture tries to follow the black reference signals when they appear and when the black reference signals do not appear, the picture, in hunting for such missing black signals tries to follow whatever black reference signals are in the reproduced picture, thereby creating a grave distortion of the reproduced image.

The back porch of the pedestal is not disturbed in a color TV system since the back porch carries the color information. If only black and white is to be transmitted, the back porch may be removed.

In FIG. 3, a TV camera 21 provides a video signal complete with horizontal and vertical synch signals. The signal produced by the camera 21 is supplied to a line amplifier 22 via a switch arm 23 in the position shown in FIG. 3, for normal picture transmission. That is, in the embodiment of FIG. 3, with the switch arm 23 in the position shown in FIG. 3, the video signal produced by the TV camera 21 is amplified by the line amplifier 22 and is fed to a modulating amplifier 24 which amplifies the signal and feeds the amplified signal to a modulated RF amplifier 25. The signal is then modulated by the modulated RF amplifier 25 on a suitable carrier produced by an RF carrier source 26 and the modulated video signal is then transmitted by means of an antenna 27. During the normal transmission of a normal video signal the system functions as described.

A monitor amplifier 28 produces an output which is fed to a monitor picture tube 29 which reproduces the picture seen by the TV camera 21, which picture is presumably reproduced at the receiver.

A microphone 31 picks up sound and produces an output which is fed to a line amplifier 32. The line amplifier 32 produces an audio signal which is fed to a frequency modulating amplifier 33. The output of the line amplifier 32 is fed to a monitor amplifier 34 which feeds a monitor loudspeaker 35. The monitor loudspeaker 35 reproduces the sound picked up by the microphone 31 which is presumably reproduced by the loudspeaker at the receiver.

A microphone 36 also picks up the sound and produces an output which is fed to a multiplex modulator 37. The multiplex modulator 37 multiplexes, and thereby encodes and renders inaudible the sound from the source. The output of the line amplifier 32 is fed to a switch arm 38 which may contact a contact **38*a*, and thereby close a circuit with the frequency modulating amplifier 33, or a contact 38*b*, and thereby close a circuit with a telephone type switchboard 39. The output of the multiplex modulator 38 is fed to a switch arm 41 which may contact a contact 41*a*, and thereby close a circuit with the frequency modulating amplifier 33, or a contact 41*b***, and thereby open its circuit.

The frequency modulating amplifier 33 produces an audio signal which is fed to an RF carrier source 42 which produces a carrier which is modulated with the audio signal from the frequency modulating amplifier 33 and feeds the modulated carrier to a modulated RF amplifier 43. The modulated audio signal is then transmitted through an antenna 44. The line amplifier 32 is connected to the frequency modulating amplifier 33 through the switch arm 38 which, during normal transmission, is preferably in the position shown in FIG. 3, thereby permitting said line amplifier to be directly connected to said frequency modulating amplifier so that the audio signal is transmitted through the antenna 44.

The video signal transmitted by the antenna 27 of the transmitting station and the audio signal transmitted by the antenna 44 of the transmitting station are received by an antenna 45 of the receiving station of FIG. 4. A switch arm 46 is in the position shown in FIG. 4 during normal transmission and reception. When the switch arm 46 contacts a contact **46*a* it connects the antenna 45 directly to the subscriber's receiver 47 and when it contacts a contact 46*b* it connects the antenna 45 to the TV receiver 47 through a decoder 48. It is thus seen that the decoder 48 may be connected between the antenna 45** and the intact receiver set of the subscriber without difficulty.

Thus, during normal or non-subscription operation of the subscription television system of the present invention, a video signal of the usual type and an audio signal of the usual type are produced in the usual manner, transmitted in the usual manner and received and reproduced in the usual manner, so that during normal operation of the subscription television system of the present invention a normal TV transmission and reproduction occurs. However, the subscription television system of the present invention is especially adapted for use as a confidential or closed-type system. The subscription television system of the present invention is also adapted for home subscriber programming, and in order to provide such operation the switch arms at the transmitting station and the switch arms at the receiving station must be operated.

If a closed-type or a subscriber-type television system is required, wherein a subscriber wishes to receive a program which is not available to non-subscribers, the subscriber may indicate his wishes by phone call or by other suitable means such as, for example, a receptacle for coins, tokens, punched cards, etc. The means for payment of the subscription may be any suitable means and may also be utilized to notify the transmitting station that the subscriber is ready to receive the special program.

In accordance with the present invention, a selected subscriber, who may be one of several hundreds of thousands of subscribers and who wishes to view special programs on occasion, is connected and/or has his TV receiver connected by telephone tie lines directly to the telephone type switchboard 39, shown in schematic form in FIG. 3. The switchboard 39 preferably comprises an automatic telephone type switchboard such as manufactured by the General Telephone Company and which functions to provide desired line connections at desired times in the manner of known automatic switchboards. Thus, if a subscriber wishes to receive a special program for which he will pay or be billed, he has merely to call in a signal to the switchboard 39 or to close a suitable manual switch such as, for example, the switch arm 46, which is then moved to contact its contact **46*b*** in the position other than that shown in FIG. 4, at his TV receiver set to alert the switchboard that such reception is desired.

The subscriber may, of course, indicate in some other suitable manner that he is desirous of receiving a subscription program. The operation of the switch arrangement 23, 38, 41 at the transmitting station insures that the subscribers receive the program transmitted on a closed circuit basis. Although the switch arms 23, 38 and 41 may be ganged together, they need not be, so that the sound may be transmitted as desired either with or without encoding from the transmitting station by air or by wire regardless of the type of transmission of the picture signal. In a preferred embodiment of the subscription television system of the present invention, however, the sound is transmitted either encoded on a multiplex sound carrier, or by wire when the picture is transmitted in secret. Thus, when a special program is to be transmitted, the transmitter control operator will initiate the transmission by operation of the transmitter control or transmitter switch arms 23, 38, 41.

The switchboard 39 is aware of the fact that identified subscribers are ready to receive the special subscription program and have paid their required subscription fees or have accordingly been billed in suitable manner, since it has been alerted by signals from the subscribers' receivers. Such alerting signals may be provided directly by coin receiving means or punched card means available at the receiver of the subscriber. At any rate, when the special program is to be transmitted, the operator of the transmitting station operates the switch arms to move the first switch arm 23 out of contact with its contact **23*a* to contact its contact 23*b* and thereby institutes the closed circuit secret subscription television system in accordance with the objective of the present invention. The operator moves the second switch arm 38 to contact its contact 38***b* if the audio is to be transmitted to the subscriber via telephone line and the operator moves the third switch arm 41 to contact its contact 41*a* if audio encoded by being modulated on a multiplex sound carrier is to be transmitted by air to the subscriber.

Thus, when the switch arm 23 is moved to contact its contact 23*b*, an encoder 51 is inserted into the circuit arrangement between the TV camera 21 and the line amplifier 22. The video signal provided by the TV camera 21 is supplied, in the encoder 51, to a synch stripper 52 which removes all the information of the video signal except the synch pulses. The video signal provided by the TV camera 21 is also supplied to a time delay 54. The synch pulses from the synch stripper 52 are fed to a gate 53. The signal fed to the gate 53 from a free-running multivibrator serves to open said gate and permit synch pulses stripped by the synch stripper 52 to be transmitted to a blocking oscillator 56. The synch stripper 52 is thus the basic source for the noise pulses which are gated by the multivibrator 55 and the gate 53 to produce such pulses at a rate of approximately 4 cycles per second. The blocking oscillator 56 breaks these pulses down into short sharp pulses of approximately 1.6 microseconds duration at a 15,750 cycle per second rate modulated into 4 cycle per second bursts. The pulses produced by the multivibrator 55 are shown in FIG. 6*a* and the pulses produced by the blocking oscillator 56 are shown in FIG. 6*b*.

The pulses produced by the blocking oscillator 56 are fed to a mixer 57. The video signal produced by the TV camera 21 is also fed to the mixer 57 via the time delay 54 which is adjusted to delay the video signal an amount sufficient to enable the pulses from the blocking oscillator 56 to be superimposed thereon in the desired front porch durations of said signal in the mixer 57. The delay time of the time delay 54 is approximately 1.6 microseconds. The output signal of the mixer 57 is thus a video signal having periodic white level signals in selected front porch durations thereof, appearing about every one-fourth of a second, each group or burst of noise signals lasting approximately one-sixteenth of a second. After inversion, these noise pulses represent peak power and blank out the front porch.

The output of the mixer 57 is supplied to a polarity inverter 58 which inverts the polarity of the entire video signal including the noise pulses, so that the white level noise pulses or signals are then converted to black level signals and induce distortion of the television picture by inducing violent side to side motion as the nonsubscriber's receiver hunts between the strongest, maximum amplitude portion of the signal transmitted with and without the noise bursts. The video signal transmitted through the transmitter antenna 27, if received by a receiver not equipped with the decoder of the present invention, will thus create violent picture distortion through scrambling induced by violent side to side motion of the picture. Since the noise pulses are merely periodic or sporadic in occurrence, when they are present, the picture seeks to follow them and when they are absent, the synch separator still tries to lock on or follow the then missing noise pulse and in so doing locks on the blackest part of the picture, thus causing the violent scrambling and distortion.

Figure 6C:
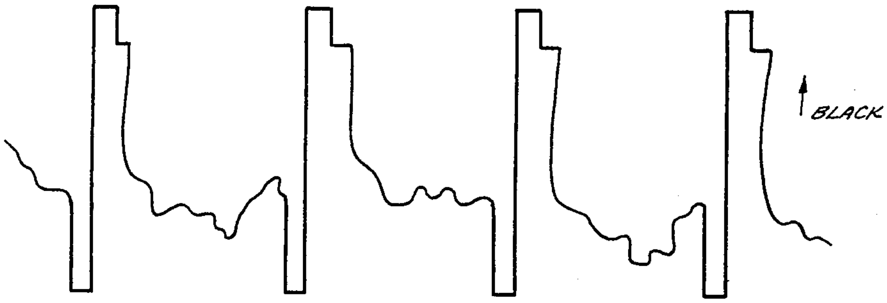
Figure 6D:
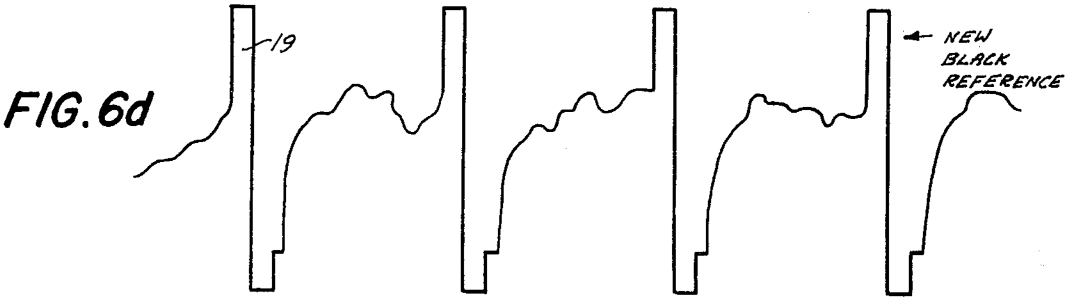
Figure 6E:
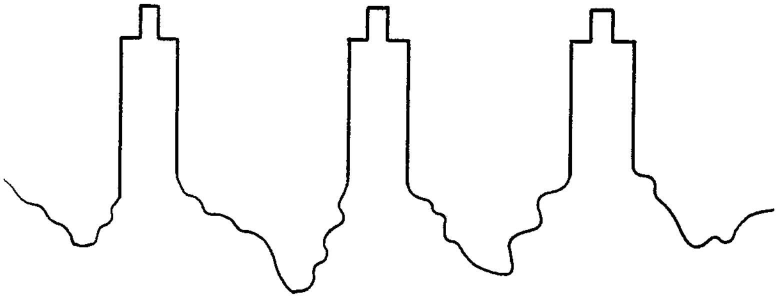

The signal produced by the mixer 57 is illustrated in FIG. 6*c* and the signal produced by the polarity inverter 58, which is the signal transmitted via the antenna 27, when the encoder 51 is connected in the circuit, is shown in FIG. 6*d*.

As shown in FIG. 5, which illustrates the signal produced by the mixer 57, the pedestal 11′ has its leading edge, shown in FIG. 2, removed and replaced by the noise signal 18, a trailing edge 71 and a blanking voltage level 12. The blanking voltage extends normally for the duration of the pedestal 11′ from the leading edge to the trailing edge, and in the system in which the noise pulse is superimposed upon the video signal, the blanking voltage extends for a duration from the trailing edge 72 of the noise pulse 18 or the leading edge 17 of the horizontal synch pulse 14′ to the trailing edge 71 of the pedestal.

The horizontal synch pulse 14′ extends from the pedestal to a distance from the reference level 13′ greater than the distance of the blanking voltage level 12 from said reference level. The horizontal synch pulse 14′ has a leading edge 17, a trailing edge 73 and a time duration $y$ smaller than the blanking voltage duration $x$ of the corresponding pedestal. Thus, each of the blanking voltage levels extends from the leading edge 17 of the corresponding horizontal synch pulse 14′.

The noise pulse 18 is periodically provided and serves as a white level signal, in the front porch duration of the pedestal 11′ so that it extends from the leading edge 16 of the pedestal, shown in FIG. 2, to the leading edge 17 of the horizontal synch pulse 14′ for a duration $z$.

In the graphical presentation of FIG. 5, the noise pulse 18 is a white level signal. The output of the polarity inverter 58 however, as shown in FIG. 6*d*, provides black level pulses 19, as hereinbefore described.

The sound or audio signals may be transmitted as desired by the operator of the transmitting station, via air as encoded or unencoded sound or via telephone line. If it is desired to maintain the sound for the subscription program secret, the switch arm 38 may be moved to contact its contact 38*b*, or the switch arm 41 may be moved to contact its contact 41*a* upon transmission of a subscription program. When the switch arm 38 is moved to contact its contact 38*b*, it feeds the output of the line amplifier 32 into the telephone lines leading to the subscribers' audio receivers via the telephone type switchboard 39. The audio signal then appears at the audio terminal 74 of the transmitting station and is received at the audio terminal 75 of the receiving station, whence it is supplied through a switch arm 76 of the receiver, when said switch arm contacts its contact 76*b*, to the audio amplifier 77 of the subscriber's decoder 48. Thus, during transmission of the closed circuit program, all the audio may be transmitted directly by wire, if so desired, so that it cannot be received by non-subscribing receivers and the picture is distorted so that it cannot be reproduced by non-subscribing receivers.

If it is desired to maintain the sound for the subscription program secret, the entire transmission may be via the air if the switch arm 41 is moved to contact its contact 41*a* upon transmission of a subscription program. When the switch arm 41 is moved to contact its contact 41*a*, it feeds the sound modulated on a multiplex sound carrier, from the multiplex modulator 37 to the frequency modulating amplifier 33 whence it is transmitted encoded, since it is modulated on a multiplex sound carrier, to the antenna 45 of the subscriber's receiver. The audio signal, modulated on a multiplex sound carrier, is then detected by a multiplex detector 78 of the decoder 48.

The aural carrier transmitted simultaneously with the multiplexed sound is utilized to transmit regular sound announcements, to give station identification, to indicate how to become a subscriber to the subscription television system and for other desired purposes.

The receiving station of FIG. 4 includes the decoder 48. The decoder 48 comprises a tuner 79 connected to the receiving antenna 45 via the switch arm 46, an IF amplifier 81 connected to the output of the tuner 79 and a detector 82 connected between the output of the IF amplifier 81 and the input of an RF amplitude modulator 83. A video local oscillator 84 feeds a suitable video carrier to the RF amplitude modulator 83.

An FM receiver 85 centered at the audio intermediate frequency is connected to the output of the tuner 79 and the multiplex detector 78 is connected between the output of the FM receiver 85 and the contact 76*a* of the switch arm 76. A frequency modulator 86 is connected to the output of the audio amplifier 77 and a local oscillator 87 is connected between the output of the frequency modulator 86 and the input of the subscriber's receiver 47.

When the subscriber indicates his intention to subscribe to a subscription program, he provides for the moving of the switch arm 46 to contact its contact **46*b*. He accomplishes this either by a suitable paying mechanism at his receiver which receives either coins or some type of card or other indicia of payment, or he provides for closing of the switch arm by indirect means comprising the contacting of a central station such as the switchboard 39 and such central station then returns a signal which moves the switch arm 46 to contact its contact 46*b*** by any suitable means such as, for example, by the energization or deenergization of a solenoid.

When the switch arm 46 contacts its contact **46*b***, the video signal of FIG. 6*d* is received by the decoder 48 along with the audio signal either undistorted or distorted by being modulated on a multiplex sound carrier. The tuner 79, IF amplifier 81 and detector 82 serves their normal functions, so that in detecting the video signal, the detector 82 reinverts said video signal and thereby changes the black level noise pulses 19 to white level noise pulses.

Since the noise pulses are only of approximately 1.6 microseconds duration, and since they occur at only 4 cycles per second, their short duration and time of occurrence make unnoticeable any output of the decoder 48, so that the output of said decoder has normal horizontal and vertical synch signals but is missing 1.6 microseconds of blanking duration about 10% of the time. By adjustment of the horizontal hold control, the noise pulses may be made invisible in most receivers.

The RF amplitude modulator 83 modulates a new carrier supplied by the video local oscillator 84 with the video signal provided by the output of the detector 82 of the decoder 48, and supplies the newly modulated signal to the TV receiver 47 of the subscriber. The video output of the detector 82 could, of course, be supplied directly to the video amplifier stage of the subscriber's TV receiver 47, but is not, in order to maintain the subscriber's receiver intact. The video signal thus received by the TV receiver 47 is essentially that of FIG. 6*c*.

The audio signal received by the antenna 45 is supplied to the FM receiver 85. The FM receiver 85 may comprise any suitable type of FM receiver, such as described in the aforementioned text books, and serves to derive the audio signal from the received signal. The audio signal derived from the received signal by the FM receiver 85 may be modulated on a multiplex sub-carrier, so it is supplied to the multiplex detector 78 which derives the audio signal from the multiplex sound carrier.

The audio signal derived from the multiplex detector is supplied via the audio amplifier 77 to the frequency modulator 86 which modulates a carrier provided by the oscillator 87 so that the unencoded frequency modulated audio signal, complete as initially provided, is reproduced. The frequency modulator 86 thus serves to modulate a secret audio signal carrier with the derived audio signal from the multiplex detector 78 to produce the resultant audio signal which is supplied with the resultant video signal from the RF amplitude modulator 83 to the TV receiver 47.

It is thus seen that the subscription television system of the present invention provides security for video and audio transmission to subscribers. Although for the purposes of clarity of illustration and clarity of disclosure, a single receiving station is indicated in FIG. 4, a plurality of receiving stations may of course be connected to a transmitting station through the telephone type switchboard 39 as indicated by the extra telephone lines 91 of FIG. 3. Each of the receiving stations may comprise the receiving means indicated in FIG. 4. Several hundred thousand receiving sets may be included in the system, these sets being accommodated through the automatic switchboard or banks of switchboards.

It is thus seen that the transmitting station is not disrupted from its normal operation due to the utilization of the switch arm arrangement 23, 38, 41 for either connecting or disconnecting the encoder 51 and the sound from the normal circuitry and that the receiving stations are not disrupted from normal operation due to the utilization of the switch arm arrangement 46, 76 for connecting or disconnecting the decoder 48 and the sound into the receiver circuitry. The transmitting and receiving means do not require major reconstruction to enable the transmission and reception of subscription programs, and neither the owners of TV sets nor the transmitting station operator are inconvenienced by the structure or operation of the encoder and decoder of the subscription system. The modifications of existing equipment required for the subscription television system are minor ones and include readily installable standard type equipment.

The utilization of telephone lines during the subscription transmission or the encoding of the sound by multiplexing, if desired, makes use of the subscription television system of the present invention exceedingly simple, although reliable and efficient in operation, and permits direct communication with each subscriber through the central station such as indicated by the switchboard 39. The switchboard 39 and the telephone lines are parts of the subscription television system which may already be in existence and which may be leased or purchased or utlized in the closed circuit TV system of the present invention.

While the invention has been described by means of specific examples and in specific embodiments, I do not wish to be limited thereto, for obvious modifications will occur to those skilled in the art without departing from the spirit and scope of the invention.

What I claim is:

1. In a television system, in combination:

transmitting means for transmitting a video signal, said video signal having a plurality of pedestals each having a leading edge, a trailing edge and a blanking voltage level at a first predetermined amplitude from a reference level and a horizontal synch pulse extending from each of said pedestals to a second predetermined amplitude from said reference level greater than said first predetermined amplitude, each of said horizontal synch pulses having a leading edge, a trailing edge and a time duration smaller than the blanking voltage duration of the corresponding pedestal so that each of said blanking voltage levels extends a determined front porch duration from the leading edge of the pedestal to the leading edge of the corresponding horizontal synch pulse, said transmitting means including transmitter audio means for simultaneously transmitting an audio signal of a frequency within the audible frequency range synchronized with said video signal;

transmitter encoding means for providing periodic selected reference level signals in selected front porch durations of said video signal and for inverting the polarity of said video signal so as to induce distortion of the picture;

receiver decoding means for receiving said video signal and for reinverting the polarity of said video signal so as to change the reference direction of said selected reference level signals and nullify the effect of said encoding means and provide an undistorted picture; and receiving means for receiving and reproducing the video signal from said receiver decoding means and for receiving and reproducing said audio signal in synchronism with said video signal.

2. In a television system, in combination:

transmitting means for transmitting a video signal, said video signal having a plurality of pedestals each having a leading edge, a trailing edge and a blanking voltage level at a first predetermined amplitude from a reference level and a horizontal synch pulse extending from each of said pedestals to a second predetermined amplitude from said reference level greater than said first predetermined amplitude, each of said horizontal synch pulses having a leading edge, a trailing edge and a time duration smaller than the blanking voltage duration of the corresponding pedestal so that each of said blanking voltage levels extends a predetermined front porch duration from the leading edge of the pedestal to the leading edge of the corresponding horizontal synch pulse, said transmitting means including transmitter audio means for simultaneously transmitting an audio signal of a frequency within the audible frequency range synchronized with said video signal;

transmitter encoding means for providing periodic noise signals in selected front porch durations of said video signal and for inverting the polarity of said video signal so as to induce distortion of the picture;

receiver decoding means for receiving said video signal and for reinverting the polarity of said video signal so as to nullify the effect of said encoding means and provide an undistorted picture; and receiving means for receiving and reproducing the video signal from said receiver decoding means and for receiving and reproducing said audio signal in synchronism with said video signal.

3. In a television system, in combination:

transmitting means for transmitting a video signal, said video signal having a plurality of pedestals each having a leading edge, a trailing edge and a blanking voltage level at a first predetermined amplitude from a reference level and a horizontal synch pulse extending from each of said pedestals to a second predetermined amplitude from said reference level greater than said first predetermined amplitude, each of said horizontal synch pulses having a leading edge, a trailing edge and a time duration smaller than the blanking voltage duration of the corresponding pedestal so that each of said blanking voltage levels extends a determined front porch duration from the leading edge of the pedestal to the leading edge of the corresponding horizontal synch pulse, said transmitting means including transmitter audio means for simultaneously transmitting an audio signal of a frequency within the audible frequency range synchronized with said video signal;

transmitter encoding means for providing periodic noise signals in selected front porch duration of said video signal and for inverting the polarity of said video signal so as to induce distortion of the picture, said transmitter encoding means including pulse means for providing pulses of a predetermined duration at a predetermined repetition rate, mixing means for superimposing pulses provided by said pulse means on said video signal, and inverting means for inverting the polarity of the video signal provided by said mixing means;

receiver decoding means for receiving said video signal and for reinverting the polarity of said video signal so as to nullify the effect of said encoding means and provide an undistorted picture; and receiving means for receiving and reproducing the video signal from said receiver decoding means and for receiving and reproducing said audio signal in synchronism with said video signal.

4. In a television system, in combination:

transmitting means for transmitting a video signal, said video signal having a plurality of pedestals each having a leading edge, a trailing edge and a blanking voltage level at a first predetermined amplitude from a reference level and a horizontal synch pulse extending from each of said pedestals to a second predetermined amplitude from said reference level greater than said first predetermined amplitude, each of said horizontal synch pulses having a leading edge a trailing edge and a time duration smaller than the blanking voltage duration of the corresponding pedestal so that each of said blanking voltage levels extends a determined front porch duration from the leading edge of the pedestal to the leading edge of the corresponding horizontal synch pulse, said transmitting means including transmitter audio means for simultaneously transmitting an audio signal of a frequency within the audible frequency range synchronized with said video signal;

transmitter encoding means for providing periodic noise signals in selected front porch durations of said video signal and for inverting the polarity of said video signal so as to induce distortion of the picture, said transmitter encoding means including pulse means for providing pulses of a predetermined duration at a predetermined repetition rate, mixing means for superimposing pulses provided by said pulse means in selected front porch durations of said video signal, and inverting means for inverting the polarity of the video signal provided by said mixing means;

receiver decoding means for receiving said video signal and for reinverting the polarity of said video signal so as to nullify the effect of said encoding means and provide an undistorted picture; and receiving means for receiving and reproducing the video signal from said receiver decoding means and for receiving and reproducing said audio signal in synchronism with said video signal.

5. In a television system, in combination:

transmitting means for transmitting a video signal, said video signal having a plurality of pedestals each having a leading edge, a trailing edge and a blanking voltage level at a first predetermined amplitude from a reference level and a horizontal synch pulse extending from each of said pedestals to a second predetermined amplitude from said reference level greater than said first predetermined amplitude, each of said horizontal synch pulses having a leading edge, a trailing edge and a time duration smaller than the blanking voltage duration of the corresponding pedestal so that each of said blanking voltage levels extends a determined front porch duration from the leading edge of the pedestal to the leading edge of the corresponding horizontal synch pulse, said transmitting means including transmitter audio means for simultaneously transmitting an audio signal of a frequency within the audible frequency range synchronized with said video signal;

transmitter encoding means for providing periodic noise signals in selected front porch durations of said video signal and for inverting the polarity of said video signal so as to induce distortion of the picture, said transmitter encoding means including pulse means for providing pulses of a predetermined duration at a predetermined repetition rate, mixing means for superimposing pulses provided by said pulse means in selected front porch durations of said video signal, each of said last-mentioned pulses extending toward the reference level of said video signal, and inverting means for inverting the polarity of the video signal provided by said mixing means;

receiver decoding means for receiving said video signal and for reinverting the polarity of said video signal so as to nullify the effect of said encoding means and provide an undistorted picture; and receiving means for receiving and reproducing the video signal from said receiver decoding means and for receiving and reproducing said audio signal in synchronism with said video signal.

6. In a television system, in combination:
transmitting means for transmitting a video signal, said video signal having a plurality of pedestals each having a leading edge, a trailing edge and a blanking voltage level at a first predetermined amplitude from a reference level and a horizontal synch pulse extending from each of said pedestals to a second predetermined amplitude from said reference level greater than said first predetermined amplitude, each of said horizontal synch pulses having a leading edge, a trailing edge and a time duration smaller than the blanking voltage duration of the corresponding pedestal so that each of said blanking voltage levels extends a determined front porch duration from the leading edge of the pedestal to the leading edge of the corresponding horizontal synch pulse, said transmitting means including transmitted audio means for simultaneously transmitting an audio signal of a frequency within the audible frequency range synchronized with said video signal;
transmitter encoding means for providing periodic noise signals in selected front porch durations of said video signal and for inverting the polarity of said video signal so as to induce distortion of the picture, said transmitter encoding means including pulse means for providing pulses of a predetermined duration at a predetermined repetition rate, mixing means for superimposing pulses provided by said pulse means in selected front porch durations of said video signal, each of said last-mentioned pulses having a time duration substantially equal to the front porch duration, and inverting means for inverting the polarity of the video signal provided by said mixing means;
receiver decoding means for receiving said video signal and for reinverting the polarity of said video signal so as to nullify the effect of said encoding means and provide an undistroted picture; and
receiving means for receiving and reproducing the video signal from said receiver decoding means and for receiving and reproducing said audio signal in synchronism with said video signal.

7. In a television system, in combination;
transmitting means for transmitting a video signal, said video signal having a plurality of pedestals each having a leading edge, a trailing edge and a blanking voltage level at a first predetermined amplitude from a reference level and a horizontal synch pulse extending from each of said pedestals to a second predetermined amplitude from said reference level greater than said first predetermined amplitude, each of said horizontal synch pulses having a leading edge, a trailing edge and a time duration smaller than the blanking voltage duration of the corresponding pedestal so that each of said blanking voltage levels extends a determined front porch duration from the leading edge of the pedestal to the leading edge of the corresponding horizontal synch pulse, said transmitting means including transmitter audio means for simultaneously transmitting an audio signal of a frequency within the audible frequency range synchronized with said video signal;
transmitter encoding means for providing periodic noise signals in selected front porch durations of said video signal and for inverting the polarity of said video signal so as to induce distortion of the picture, said transmitter encoding means including pulse means for providing pulses of a predetermined duration at a predetermined repetition rate, mixing means for superimposing pulses provided by said pulse means in selected front porch durations of said video signal, each of said last-mentioned pulses extending toward the reference level of said video signal and having a time duration substantially equal to the front porch duration, and inverting means for inverting the polarity of the video signal provided by said mixing means;
receiver decoding means for receiving said video signal and for reinverting the polarity of said video signal so as to nullify the effect of said encoding means and provide an undistorted picture; and
receiving means for receiving and reproducing the video signal from said receiver decoding means and for receiving and reproducing said audio signal in synchronism with said video signal.

8. In a television system, in combination;
transmitting means for transmitting a video signal, said video signal having a plurality of pedestals each having a leading edge, a trailing edge and a blanking voltage level at a first predetermined amplitude from a reference level and a horizontal synch pulse extending from each of said pedestals to a second predetermined amplitude from said reference level greater than said first predetermined amplitude, each of said horizontal synch pulses having a leading edge, a trailing edge and a time duration smaller than the blanking voltage duration of the corresponding pedestal so that each of said blanking voltage levels extends a determined front porch duration from the leading edge of the pedestal to the leading edge of the corresponding horizontal synch pulse, said transmitting means including transmitter audio means for simultaneously transmitting an audio signal of a frequency within the audible frequency range synchronized with said video signal;
transmitter encoding means for providing periodic noise signals in selected front porch durations of said video signal and for inverting the polarity of said video signal so as to induce distortion of the picture, said transmitter encoding means including pulse means for providing pulses of a predetermined duration at a predetermined repetition rate, mixing means for superimposing pulses provided by said pulse means in selected front porch durations of said video signal, each of said last-mentioned pulses extending toward the reference level of said video signal and having a time duration substantially equal to the front porch duration, and inverting means for inverting the polarity of the video signal provided by said mixing means;
receiver decoding means for receiving said video signal and for reinverting the polarity of said video signal so as to nullify the effect of said encoding means and provide an undistorted picture, said receiver decoding means comprising detecting means for detecting and inverting said video signal; and
receiving means for receiving and reproducing the video signal from said receiver decoding means and for receiving and reproducing said audio signal in synchronism with said video signal.

9. In a television system, in combination:
transmitting means for transmitting a video signal, said video signal having a plurality of pedestals each having a leading edge, a trailing edge and a blanking voltage level at a first predetermined amplitude from a reference level and a horizontal synch pulse extending from each of said pedestals to a second predetermined amplitude from said reference level greater than said first predetermined amplitude, each of said horizontal synch pulses having a leading edge, a trailing edge and a time duration smaller than the blanking voltage duration of the corresponding pedestal so that each of said blanking voltage levels extends a determined front porch duration from the leading edge of the pedestal to the leading edge of the corresponding horizontal synch pulse, said transmitting means including transmitter audio means for simultaneously transmitting an audio signal of a frequency within the audible frequency range synchronized with said video signal;

transmitter encoding means for providing periodic noise signals in selected front porch durations of said video signal and for inverting the polarity of said video signal so as to induce distortion of the picture, said transmitter encoding means including pulse means for providing pulses of a predetermined duration at a predetermined repetition rate, mixing means for superimposing pulses provided by said pulse means on said video signal, and inverting means for inverting the polarity of the video signal provided by said mixing means;

receiver decoding means for receiving said video signal and for reinverting the polarity of said video signal so as to nullify the effect of said encoding means and provide an undistorted picture, said receiver decoding means comprising means for deriving said video signal and said audio signal from the received signal, means for inverting said video signal to nullify the effect of said encoding means, means for modulating the derived inverted video signal on a video carrier, means for modulating the derived audio signal on an audio carrier and means for combining the modulated derived inverted video signal and the modulated derived audio signal to provide a resultant signal; and receiving means for receiving and reproducing the video signal from the resultant signal provided by said receiver decoding means and for receiving and reproducing said audio signal from the resultant signal provided by said receiver decoding means in synchronism with said video signal.

10. In a television system, in combination:

transmitting means for transmitting a video signal, said video signal having a plurality of pedestals each having a leading edge, a trailing edge and a blanking voltage level at a first predetermined amplitude from a reference level and a horizontal synch pulse extending from each of said pedestals to a second predetermined amplitude from said reference level greater than said first predetermined amplitude, each of said horizontal synch pulses having a leading edge, a trailing edge and a time duration smaller than the blanking voltage duration of the corresponding pedestal so that each of said blanking voltage levels extends a determined front porch duration from the leading edge of the pedestal to the leading edge of the corresponding horizontal synch pulse, said transmitting means including transmitter audio means for simultaneously transmitting an audio signal of a frequency within the audible frequency range synchronized with said video signal;

transmitter encoding means for providing periodic noise signals in selected front porch durations of said video signal and for inverting the polarity of said video signal so as to induce distortion of the picture, said transmitter encoding means including pulse means for providing pulses of a predetermined duration at a predetermined repetition rate, mixing means for superimposing pulses provided by said pulse means in selected front porch durations of said video signal, each of said last-mentioned pulses extending toward the reference level of said video signal and having a time duration substantially equal to the front porch duration, and inverting means for inverting the polarity of the video signal provided by said mixing means;

receiver decoding means for receiving said video signal and for reinverting the polarity of said video signal so as to nullify the effect of said encoding means and provide an undistorted picture, said receiver decoding means comprising means for deriving said video signal and said audio signal from the received signal, means for inverting said video signal to nullify the effect of said encoding means, means for modulating the derived inverted video signal on a video carrier, means for modulating the derived audio signal on an audio carrier and means for combining the modulated derived inverted video signal and the modulated derived audio signal to provide a resultant signal; and receiving means for receiving and reproducing the video signal from the resultant signal provided by said receiver decoding means and for receiving and reproducing said audio signal from the resultant signal provided by said receiver decoding means in synchronism with said video signal.

References Cited

UNITED STATES PATENTS

| | | | |
|---|---|---|---|
| 3,069,492 | 12/1962 | D'Agostini | 178—5.1 |
| 3,081,376 | 3/1963 | Loughlin | 178—5.1 |

ROBERT L. GRIFFIN, *Primary Examiner.*

H. W. BRITTON, *Assistant Examiner.*